United States Patent Office 3,704,139
Patented Nov. 28, 1972

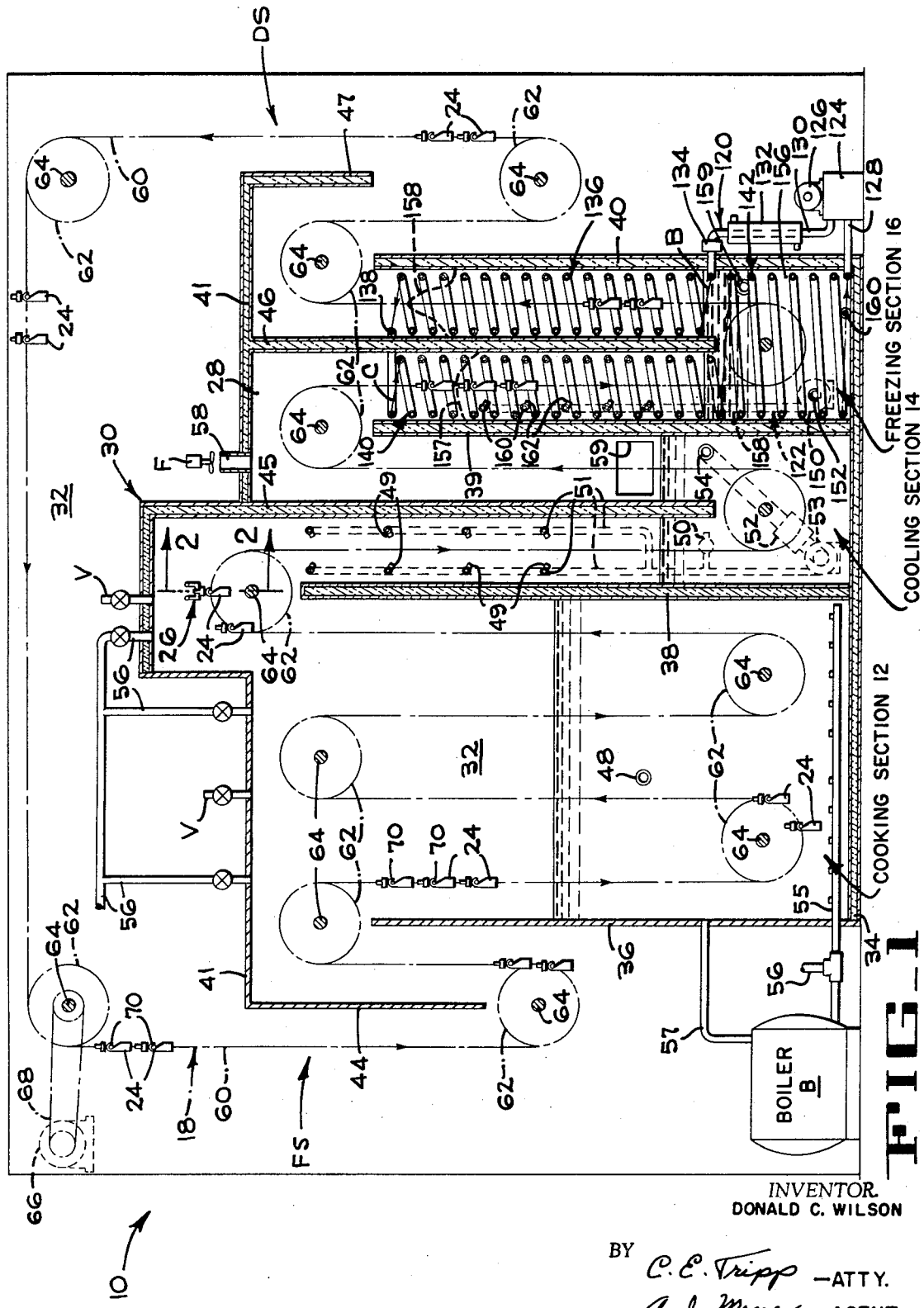

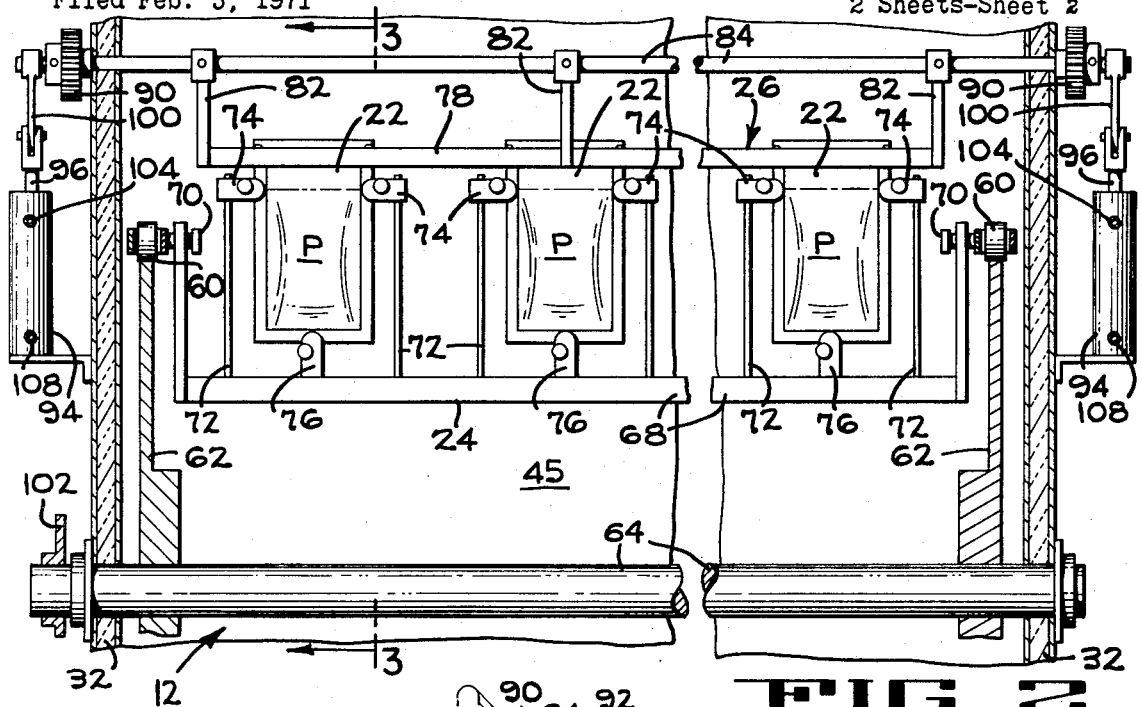
FIG_2
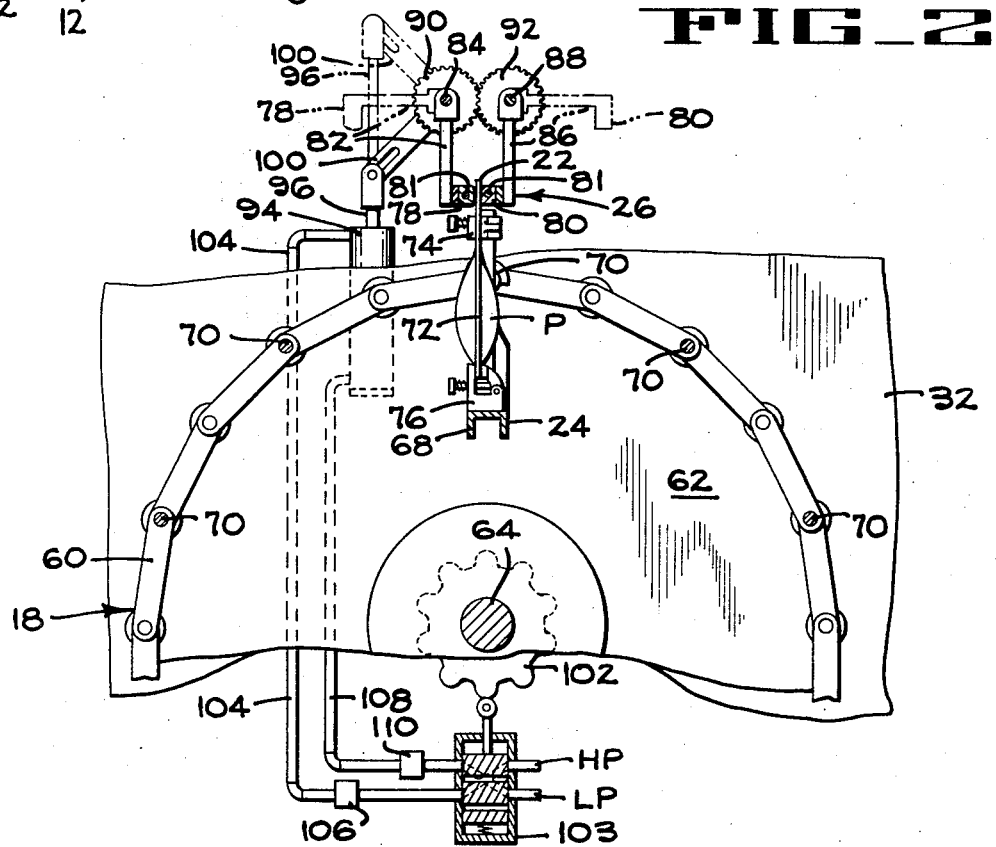
FIG_3

3,704,139
COOKING AND FREEZING PRODUCTS IN
FLEXIBLE CONTAINERS
Donald C. Wilson, San Jose, Calif., assignor to FMC
Corporation, San Jose, Calif.
Filed Feb. 3, 1971, Ser. No. 112,194
Int. Cl. B65b 55/14; A23l 3/36, 3/02
U.S. Cl. 99—192 R 13 Claims

ABSTRACT OF THE DISCLOSURE

A method and apparatus for continuously heat treating food filled flexible containers by stretching each container across its open mouth to provide a one-way valve therein and to then cook or blanch the product retaining the product and all liquids and solids emitting therefrom within the container while allowing only gases to escape from the containers during the cooking step. After cooking, the mouth of the flexible container or pouch is sealed, the pouch is cooled in water and, after being dried, is thereafter moved through a freezing zone for quickly freezing the contents of the pouch. The method provides a product in the form of a boil-in-the-bag pouch having a low headspace and a frozen food product therein which is high in nutritional value. Since the heat treatment fluids used during cooking, cooling, and freezing are not contaminated by the food product, these fluids are recirculated for reuse.

CROSS REFERENCE TO RELATED APPLICATIONS

The method and apparatus of the present invention concerns cooking or blanching food products in flexible containers or pouches when a one-way valve is formed across the mouth of each pouch as disclosed in my U.S. Letters Patent Nos. 3,501,318 which issued on Mar. 13, 1970 and 3,528,826 which issued on Sept. 15, 1970. The pouches may also be sealed by apparatus of the type disclosed in my copending application Ser. No. 860,335, filed on Sept. 23, 1969.

BACKGROUND OF THE INVENTION

Field of the invention

This invention relates to a method and apparatus for continuously cooking or blanching and thereafter freezing food products in pouches to provide a frozen boil-in-the-bag food product which is high in nutritional value and has a low micro-organism population.

Description of the prior art

Heretofore it has been believed necessary to blanch or precook food products such as vegetables or grains prior to placing and sealing the product in pouches or other types of containers for subsequent cooking and/or freezing. If a product such as spinach, for example, was sealed in containers prior to blanching, the volume of the product would be so drastically reduced by shrinkage that only a small portion of the container would be filled and thus would not receive favorable customer acceptance. When sealing products such as rice prior to blanching or precooking, it was noted that an objectionable smell and taste of straw was present in the container when opened. Disagreeable odors were also noted in other products that were not blanched or precooked prior to being sealed in containers. Thus, when packaging in accordance with prior art methods, the food product was precooked or blanched prior to being filled and sealed in the containers. During this precooking or blanching, the cells of the food product rupture releasing nutritional fluids which are lost in the blanching water. This contaminated blanching water cannot be reheated and reused but must be discharged as waste water. Thus, the prior art methods require considerable amounts of replacement water which must be heated at considerable expense to the canner. Also, those prior art blanching methods have very poor ecological aspects because very large amounts of contaminated processing water must be discharged into sewers or disposed of in other ways.

Since a blanched product is usually softer than an unblanched product, more waste and damage to the product itself occurs when the product is packaged after precooking or blanching than occurs if the product is packaged before any cooking or heat treatment steps take place. When the product is precooked or blanched prior to being filled into the packages, it is recognized that much of the nutritional value and fresh flavor of the food product remains in the cooking liquid and, accordingly, is lost during this preliminary heat treatment.

In certain prior art methods of packaging food products in boil-in-the-bag pouches, the product is first precooked or blanched as above described, is then filled and sealed in the pouch, and is thereafter conveyed to a freezer for subsequent freezing. Other prior art methods bulk freeze after blanching and prior to filling. When orders are received the bulk frozen food is filled into pouches in quantities sufficient to fill the particular orders. Thus, it is apparent that because of the intermediate filling step a considerable lapse in time occurs in these prior art methods between the precooking or blanching step, and the freezing step. It is recognized that any appreciable lapse of time between these two steps is detrimental in that it allows the micro-organism count to increase and thus reduce product quality.

The frozen pouches are subsequently distributed to the ultimate user such as housewives who, when they wish to use the product, merely place the entire frozen pouch into water and boil the water until the product is cooked.

SUMMARY OF THE INVENTION

In accordance with the cooking and freezing method and apparatus of the present invention, fresh washed, water containing food products such as vegetables, grain or combinations thereof are placed in pouches of the type commonly referred to as "boil-in-the-bag pouches" prior to any blanching or other heat treatment operations. If required, the food product is also graded prior to being placed in the pouches. The filled pouches are then clamped onto a conveyor to provide a one-way valve in the mouth of each pouch so that gases, including steam, can escape from the pouch but cannot enter the pouch. Each pouch is then precooked. The precooking may take place by moving the pouch horizontally through water at about 212° F., but preferably by conveying the pouch along a vertical zig-zag path alternately through a steam chamber and a water bath maintained at about 212° F. The mouth of the pouch is sealed prior to moving out of the steam chamber in the cooking section, and the pouch is then moved through a cooling water sprayer and a cooling water bath. The pouch is thereafter moved upwardly into a vented air chamber which is evacuated by a fan to dry the pouch. The product in the pouch is then quickly frozen by being moved downwardly and upwardly between coils of a freezing chamber. When moving downwardly into the first leg of the freezing chamber, liquid refrigerant is sprayed onto the pouch to accelerate cooling. The pouch then moves through a liquid reservoir of refrigerant in the lower portion of the freezing chamber and thereafter moves upwardly between freezing coils and through gaseous refrigerant during which time the liquid refrigerant evaporates from the pouch and condenser on the coils. The quickly frozen pouch is then removed from the conveyor and placed in storage at a temperature below 32° F. until distributed and used by the housewife who heats the product by placing the entire bag or pouch in boiling water for a period sufficient to heat the product to serving temperature and, if necessary, to more completely cook the particular product packaged in the pouch.

One object of the present invention is to provide a continuous method of and apparatus for blanching a clean washed food product which is unheated prior to being filled into a pouch.

Another object is to provide a continuous method for blanching previously unheated food products in a pouch having a one-way valve therein which valve allows gases to escape from the pouch but prevents escape of any food or liquid from the pouch, and to therefore seal and freeze the pouch and product therein.

Another object is to provide a blanching process which minimizes waste of heat treatment fluids by performing the blanching operation on fresh food products when the food product is confined in a flexible pouch that is provided with a one-way valve which allows only gases to escape from the pouch while preventing any solid and liquid particles of the food product from entering the processing fluid by retaining these solids and liquids within the pouch.

BRIEF DESCRIPTION OF THE DRAWINGS

FIG. 1 is a diagrammatic vertical section through the precooking and freezing apparatus of the present invention.

FIG. 2 is a vertical section taken along lines 2—2 of FIG. 1 illustrating carriers which form a one-way valve in the mouth of each pouch and further illustrating the sealing head, certain parts being cut away.

FIG. 3 is a vertical section taken along lines 3—3 of FIG. 2.

DESCRIPTION OF PREFERRED EMBODIMENT

The cooking and freezing apparatus 10 (FIG. 1) of the present invention comprises a cooking section 12, a cooling section 14, and a freezing section 16. An endless conveyor 18 is trained along a vertical zig-zag path past a feed station FS, through the sections 12, 14 and 16, and past a discharge station DS. At the feed station FS, filled pouches P having their mouths 22 (FIG. 2 and 3) open are clamped on carriers 24 of the conveyor 18 to form a one-way valve in each pouch mouth 22. The conveyor 18 is continuously driven and moves these pouches through the cooking section 12 at which time cooking gases and headspace gases are vented through the one-way valve in each pouch. The pouches are then sealed by a sealing mechanism 26 in the cooking section and are then moved downwardly into the cold water in the cooling section 14. The pouches P are then moved upwardly in a vented drying chamber 28 prior to moving through the freezing section 16 during which time the product is quickly frozen. The frozen pouches are then removed from the conveyor 18 at the discharge station DS for subsequent storage and distribution to the ultimate customer.

More particularly, the cooking and freezing apparatus 10 (FIG. 1) comprises a multi-compartmented housing 30 having side walls 32 (only one wall being shown in FIG. 1), a floor 34 welded in fluid tight engagement to the side walls 32, and vertical walls 36, 38, 39 and 40 extending upwardly from the floor 34 and welded in fluid tight engagement to the floor and to the side walls 32. A multi-level roof 41 is welded between the side walls 32, and has downwardly projecting walls 44, 45, 46, and 47 welded thereto and to the side walls, which vertical walls terminate short of the floor 34. The side walls 32, floor 34, a portion of the roof 41 and the walls adjacent the freezing section are all insulated to minimize undesirable heat transfer.

The lower portion of the cooking section 12 between the walls 36 and 38 is maintained filled with water from a valved conduit 48. Cooling water is directed through spray nozzles 49, disposed in the upper portion of the cooling section 14, from valved inlet conduit 50 and vertical and horizontal headers 51. This cooling water is collected in the lower portion of the cooling section 14 and may be recirculated to the nozzles 49 after passing through a heat exchanger 52 by a pump 53 which takes suction from conduit 54.

A steam manifold 55 is provided in the cooking section 12 to heat the water to about 212° F. Steam at about 212° F. is also directed into the cooking section 12 above the water level through valved conduits 56. The steam is preferably generated in a steam boiler B that is connected to the conduits 55 and 56 and which receives its water from a conduit 57 connected to the supply of processing water in the cooking section 14. Valved vent ports V are provided in the cooking section 12 and are opened as required to purge air and/or cooking gases therefrom. A power driven fan F is positioned adjacent an open vent 58 in the upper end of the air chamber 28 and draws air from an inlet opening 59 to dry the pouch by continuously purging water vapor from the air chamber 28. If water vapor was carried by the pouch into the freezing section 16, ice would form on the pouch and would float on top of the liquid refrigerant in the freezing section 16 thereby contaminating the refrigerant.

The conveyor 18 comprises two spaced parallel endless chains 60 (FIGS. 2 and 3) which are guided through the apparatus 10 by a plurality of pairs of sprockets 62 keyed to shafts 64 journaled in the side walls 32, and by guide tracks (not shown). The conveyor 18 is continuously driven by a motor 66 (FIG. 1) which is connected to at least one of the shafts 64 by a chain drive 68.

As best shown in FIGS. 2 and 3, the carriers 24 each include a generally U-shaped body 68 which is mounted for pivotal movement on pins 70 projecting inwardly from the chains 60 as by hooking as illustrated in FIG. 2. Each carrier 24 includes a plurality of pairs of upstanding resilient arms 72 having clamps 74 on the upper ends thereof. A pouch is clamped between each pair of spring arms 72, and the arms exert a sufficient outward or tensioning force across the mouth 22 of the pouch to form a one-way valve in each pouch thus allowing gases to escape from the pouch but preventing either gases or liquids from entering the pouch. The bottom of each pouch is also connected to the carrier 24 by a clamp 76 thus preventing flotation of the pouch. The specific details of the construction of the carriers and the theory of operation of a one-way valve are more completely disclosed in my Pat. 3,501,318. Reference may be had to said patent if a more detailed description of these features is desired.

The pouches P are of the well known heat sealable type, being formed from a heat sealable material such as polyethylene and may either be of the clear film type or be laminated with other material such as aluminum and a polyester as disclosed in my aforementioned Pats. 3,501,- 318 and 3,528,826.

The sealing mechanism 26 may be of any suitable type and as diagrammatically illustrated in FIGS. 2 and 3 comprises a pair of elongated sealing jaws 78 and 80 which are heated to a sealing temperature of between about 250 and 300 degrees F. by electrical heating elements 81. The jaw 78 is mounted on a plurality of spaced arms 82 keyed to a shaft 84 that is journaled in the side walls 32. Similarly, the jaw 80 is mounted on a plurality of spaced arms 86 that are keyed to a shaft 88 journaled in the side walls 32. Pinions 90 are keyed to the end portions of the shaft 84 and mesh with pinions 92 keyed to shaft 88 thus causing the sealing jaws 78 and 80 to move equal amounts in opposite directions in response to pivotal movement of the shafts 84 and 88. The shafts 84 and 88 are pivoted between the inactive open position illustrated in dotted lines in FIG. 3 and the active sealing position illustrated in solid lines in FIG. 3 by hydraulic power units 94. The piston rods 96 of the power units 94 are connected to lever arms 100 keyed to the shaft 84. The power units 94 are operated in timed relation with the movement of the conveyor 18 by a cam 102 (FIG. 3) that is keyed to one of the shafts 64 and moves the core of a four-way valve 103 between the illustrated cross-passage position and a parallel passage position. When in the cross-passage position, high pressure fluid flows from the high pressure conduit HP through a conduit 104 having a speed control valve 106 of well known design therein and into the upper end of both power units 94 thereby squeezing the mouth of the pouches P between the sealing jaws 78 and 80 as illustrated. During this time the fluid in the other ends of the power units return to the sump of the pumping unit (not shown) through a conduit 108 having a speed control valve 110 therein, through the valve 103, and through a low pressure conduit LP. It has been determined that a sealing pressure of 250 p.s.i. is effective to seal the pouches P when pressure is applied for four seconds and the jaws are heated to 280° F.

When the valve 103 is shifted to the parallel passage position by the cam 102, high pressure fluid flows through conduit 108 into the lower end of the power unit 94 thereby moving the jaws to the inactive dotted line positions.

The freezing section 16 (FIG. 1) includes a closed refrigeration system 120 and an open refrigeration system 122. The closed system includes the usual compressor 124 which is driven by a motor 126 and receives a refrigerant in gaseous form at about −20° F. from a conduit 128 and compresses it into a liquid. The liquid refrigerant is directed through a conduit 130 that passes through a water cooler 132 which cools the compressed coolant to about 60° F. The refrigerant then passes through an expansion valve 134 which causes at least a portion of the refrigerant to expand into a gas and thereby be cooled to a temperature of about −20° F. This refrigerant then flows in the direction of the arrows B upwardly through a generally rectangular refrigerant coil 136 which is disposed between the side walls 32 and the vertical walls 40 and 46. Upon reaching the upper end of the coil 136, the refrigerant flows into a transfer section 138 which communicates with the upper end of a second generally rectangular refrigerant coil 140 disposed between the walls 39 and 46. The refrigerant in the coil 140 then flows downwardly as indicated by the arrows C. The lower end of the refrigerant coil 140 communicates directly with a rectangular refrigerant coil 142 that is larger in width than the other coils and is disposed between the side walls 32 and the vertical walls 39 and 40. The refrigerant flows from the lower end of the coil 140 into and through the coil 142 and returns to the compressor 124 in a gaseous state through the conduit 128 to complete its cycle of operation.

In order to increase the freezing rate and thereby obtaining a fine crystalline structure and a higher quality product than would occur if the product was slowly frozen, which slow freezing wuold cause large ice crystals to form within the product, the open refrigeration system 122 is employed. The open system 122 includes a pump 150 which draws refrigerant through a suction port 152 from a reservoir 156 of the refrigerant in the lower portion of the freezing section. The pump 150 directs the refrigerant upwardly through a manifold 158 which includes a series of vertically spaced horizontal headers 160 each having a plurality of nozzles 162 (only one nozzle on each header being shown). The headers 160 extend substantially the full width of the inlet leg of the freezing section 16 and the nozzles are spaced so as to direct refrigerant against all of the pouches moving therepast. The refrigerant which is not vaporized upon contact with the warmer pouches P falls into the reservoir 156 for re-circulation. The refrigerant which is vaporized upon contact with the pouches is about four times heavier than air. The vaporized refrigerant raises to a level indicated by the dotted line 157, condenses on the refrigerant coil 140, and is then collected in the reservoir for recirculation. The free refrigerant in the reservoir is maintained in its liquid state at about −150° F. by the refrigerant that is circulated within the refrigerant coil 142.

When the pouches P are moving upwardly within the coil 136 in the outlet leg of the freezing section 16, they are dried of refrigerant since the refrigerant vaporizes therefrom forming vapor which reaches a level indicated by the dotted line 158. This vapor is subsequently condensed upon contact with the coil 136 and falls as a liquid into the reservoir 156. Refrigerant may be directed into the reservoir 156 through valved conduit 159 as required and may be drained from the reservoir 156 from valved conduit 160 when the apparatus 10 is shut down.

The refrigerant used in the open refrigerant system 122, and which may also be used in the enclosed system 120, must have a large molecular weight, such as the chloro-fluoro-hydrocarbons. Such refrigerant may be of the type known as No. 12 (the number is usually preceded by a trade name) and may be identified by the formula $$CCl_2\text{---}F_2^{(12)}$$

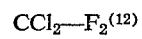

When this type of refrigerant is in the gaseous state, it will be about four times heavier than air, and accordingly, will remain in the freezing section as indicated by the dotted lines 157 and 158 and will not be vented to any appreciable extent with the water vapor in the air chamber 28. It is recognized that any tendency for the refrigerant to vent with the moist air may be eliminated by having the liquid level above the bottom end of wall 46. It is also recognized that the level of refrigerant in the reservoir can be raised to increase the amount of freezing and can be lowered to decrease the amount of freezing time for any particular conveyor speed. The quantity of freezing can also be adjusted by the flow rate of refrigerant through the nozzles.

In operation, pouches P which are preferably transparent low to medium density polyethylene or polyester pouches of the type known as "boil-in-the-bag" pouches, are filled with an uncooked, clean, water containing food product which includes food products that do not include free liquids when packaged but which rely on their own juices, or clinging water, to provide sufficient water to form steam during cooking. The filled pouches are then attached to the carriers 24 by the clamps 74 and 76 (FIGS. 2 and 3). The resilient arms 72 provide a tensioning force across the mouth of each pouch P thereby providing a one-way valve in the pouch 22 allowing air, steam, and cooking gases to be expelled from each pouch and preventing gases or liquids from entering the pouch.

The continuously driven conveyor 18 then advances the pouches P alternately through steam at about 212° F. and water at about 212° F. thereby precooking or blanching the previously uncooked food product within each pouch and also purging the air, steam, and cooking gases from each pouch. As stated in detail in my aforementioned Pat. No. 3,528,826, repeated immersions of a pouch having a one-way valve therein causes even the rather stiff metallic foil pouches to collapse thereby reducing the headspace in each pouch to a minimum. The cooking gases which may have a disagreeable odor are thus purged from the pouch by this precooking or blanching step. It will be understood however, that the portion of the water containing food product that is broken down or is reduced to a liquid during precooking is high in nutritional value and is not lost but is retained within the pouch. It will also be recognized that since the pouches P are flexible, products such as fresh spinach may be overfilled volume-wise in the pouch so as to compensate for its known large amount of shrinkage during precooking or blanching.

The filled and precooked pouches P are then sealed by the sealing mechanism 26 while in an atmosphere of steam at about 212° F. The precooked and sealed pouches are then moved into the cooling water in the lower end of the cooling section 14 thereby condensing the steam within each sealed pouch and cooling the product to below about 120° F. The cooled pouches are then moved out of the cooling water and through the air chamber during which time the cooling water evaporates from the outer surfaces of the pouches P and is vented from the air chamber 28 through the vent 58.

The pouches P are then moved downwardly into the inlet leg of the freezing section 16 within the refrigerant coil 140. When moving downward, the pouches are at all times cooled by the coils 140 and 142 of the closed refrigeration system 120. During this time the pouches are also cooled by the gaseous and liquid refrigerant of the open system 122. In this regard, the pouches P first enter a zone of gaseous refrigerant which as mentioned previously is heavier than air and raises only to a level indicated generally by the dotted lines 157 in FIG. 1. As the pouches P continue to move downwardly, liquid refrigerant at about $-20°$ F. is sprayed from the nozzles 162 upon the pouches. Much of this refrigerant vaporizes upon contact with the warmer surfaces of the pouches P, and shortly thereafter condenses upon contact with the coil 140 which is maintained below $-20°$ F. The condensate is collected in the reservoir 156 and is maintained in the liquid state by the coil 142. After the pouches P have moved downwardly through the refrigerant coil 140 and through the refrigerant in the reservoir 156, it moves upwardly through the refrigerant coil 136 during which time the liquid refrigerant on the pouches evaporates causing a vapor zone to raise to the level somewhat as indicated by the dotted line 158 in FIG. 1. The vapor condenses on contact with the colder coil 136 and falls back into the reservoir 156 in the form of a liquid for recirculation. The pouches P are then conveyed out of the freezing section 16 with their outer surfaces dry of refrigerant, and with the product therein frozen. The frozen pouches P are then removed from the conveyor 18 at the discharge station DS and are retained in their frozen condition until the ultimate consumer is ready to use the product.

The consumer then places the pouches with the frozen product therein in water which is raised to a boiling temperature of 212° F. and is maintained at that temperature until the product is cooked and/or heated to serving temperature after which time it is served.

Since substantially all of the air and cooking gases are purged from the pouch during the precooking step, and the pouch is thereafter sealed when substantially all the gas within the pouch is condensible steam, very little headspace gas is present in the pouch during the final cooking after freezing thus preventing objectionable flotation of the pouch at this time. It will also be recognized that since the product has not been blanched or precooked prior to being filled in the pouches with the resultant loss of food value, the packaged product will be high in nutritional value and will retain the flavor of garden fresh products.

It is also quite important to note that all heat treatment mediums which contact the pouches during the blanching or precooking, cooling, and freezing operations remain clean since all food products are retained within the pouches. Thus, the method and apparatus of the present invention greatly improves the ecological considerations over prior blanching and freezing techniques since the processing fluids may be reused as opposed to being discharged into sewers.

From the foregoing description it will be apparent that the method and apparatus of the present invention discloses the concept of blanching or precooking fresh food products when in unsealed pouches thereby allowing air and cooking gases to be purged therefrom. The pouches P are then sealed prior to movement out of the cooking section and are thereafter cooled and quickly frozen all in one continuous operation. By processing in accordance with the above method, an improved boil-in-the-bag commodity is provided since a smaller head space is present in the pouch and since all of the nutritional value of the food product is retained within the pouch.

Although the best mode contemplated for carrying out the present invention has been herein shown and described, it will be apparent that modification and variation may be made without departing from what is regarded to be the subject matter of the invention.

What I claim is:

1. A method of processing a water containing food product in a filled flexible pouch having an open mouth comprising the steps of forming a one-way valve in the mouth of the pouch for allowing gases to escape therefrom and for precluding entrance of fluids into the pouch, said valve formed by applying a tensioning force across the mouth of the pouch precooking the product in the pouch by alternately moving the pouch through steam and water maintained at about 212° F., sealing the pouch while in an atmosphere of steam at about 212° F., cooling the pouch to condense the condensible gases therein, and freezing the product within the pouch.

2. A method of processing a filled pouch according to claim 1 wherein substantially all of the non-condensible air and cooking gases are purged from the pouch prior to sealing to provide a sealed pouch with a very small headspace.

3. A method of processing a filled pouch according to claim 1 wherein the pouch is precooked, sealed, cooled, and frozen while the pouch is moving at a constant speed along a predetermined path.

4. A method of processing a filled pouch according to claim 1 wherein the product within the pouch is frozen while being moved through coils having a refrigerant circulated therethrough.

5. A method of procesing a filled pouch according to claim 4 wherein a refrigerant is also sprayed onto the pouch while the pouch is moving through said coils, and wherein refrigerant which evaporates upon contact with the pouch is subsequently condensed upon contact with the refrigerant coils.

6. A method according to claim 5 wherein the refrigerant being sprayed on the pouch has a large molecular weight and accordingly is heavier than air.

7. A method of processing a filled pouch according to claim 1 wherein the product within the pouch is frozen while moving through sprays of liquid refrigerant and thereafter through a reservoir of liquid refrigerant.

8. A method according to claim 7 wherein the refrigerant is a chloro-fluoro-hydrocarbon having a large molecular weight.

9. A method of processing a filling pouch according to claim 7 wherein some of the refrigerant evaporates upon contact with the pouch and wherein the evaporated refrigerant is subsequently condensed and collected as a liquid in the reservoir.

10. A method of processing a filling pouch according to claim 1 wherein the pouch is frozen while being moved through a spray of liquid refrigerant that is disposed within coils having refrigerant circulated therethrough.

11. A method of decreasing food loss during blanching and packaging of a food product comprising the steps of filling a fresh washed previously unheated food product into an unsealed pouch, forming a one-way valve in the pouch by applying a tensioning force across the mouth of the pouch, precooking the product while in the unsealed pouch by alternately moving the pouch through steam and water maintained about 212° F., purging air and gases from the unsealed pouch while retaining all of the solids and liquids released from the product within the pouch during cooking, sealing the pouch, and cooling the pouch and product therein to a temperature below 32° F.

12. A method of minimizing waste of heat treatment fluids during blanching of a food product in unsealed flexible containers comprising the steps of filling an uncooked food product into each of the flexible containers, forming a one-way valve in each flexible container by applying a tensioning force across the mouth of the container, providing a heated aqueous heat treatment blanching fluid in the form of steam and water moving the unsealed containers alternately through the steam and water to precook the product, allowing only gases to escape from the containers through the one-way valve during blanching while retaining the product and any liquid or particles emitting therefrom in the containers thereby retaining the aqueous blanching fluid in an uncontaminated reuseable state, and recirculating and reheating the uncontaminated blanching liquid for blanching the product within other containers passing therethrough.

13. A method according to claim 12 and additionally comprising the steps of sealing each container, passing the sealed containers through liquid cooling fluids for cooling the containers to a temperature below 32° F., and recirculating at least one of the cooling fluids for reuse.

References Cited

UNITED STATES PATENTS

| 2,364,049. | 12/1944 | Bensel | 99—193 |
| 3,027,261 | 3/1962 | Samara | 99—171 H |
| 3,108,881 | 10/1963 | Shaw et al. | 99—214 |
| 3,261,140 | 7/1966 | Long et al. | 99—214 |
| 3,501,318 | 3/1970 | Wilson | 99—214 |
| 3,528,826 | 9/1970 | Wilson | 99—214 |

FOREIGN PATENTS

| 498,224 | 12/1953 | Canada | 99—171 H |

WILBUR L. BASCOMB, JR., Primary Examiner

C. P. RIBANDO, Assistant Examiner

U.S. Cl. X.R.

99—214, 216, 171 H

PO-1050
(5/69)

UNITED STATES PATENT OFFICE
CERTIFICATE OF CORRECTION

Patent No. 3,704,139     Dated November 28, 1972

Inventor(s) DONALD C. WILSON

It is certified that error appears in the above-identified patent and that said Letters Patent are hereby corrected as shown below:

Column 1, line 41 - After "1969" insert -- now Patent No. 3,650,088 which issued on March 21, 1972 --.
Column 2, line 45 - After "bag" insert -- " --.
Column 2, line 45 - After "pouches" delete -- " --.
Column 5, line 57 - Change "wuold" to -- would --.
Column 6, line 3 - Change "-150°F" to -- -15°F --.

Signed and sealed this 30th day of April 1974.

(SEAL)
Attest:

EDWARD M.FLETCHER,JR.
Attesting Officer

C. MARSHALL DANN
Commissioner of Patents